F. E. DAVIS.
PLOW.
APPLICATION FILED OCT. 16, 1913.
1,097,396.
Patented May 19, 1914.
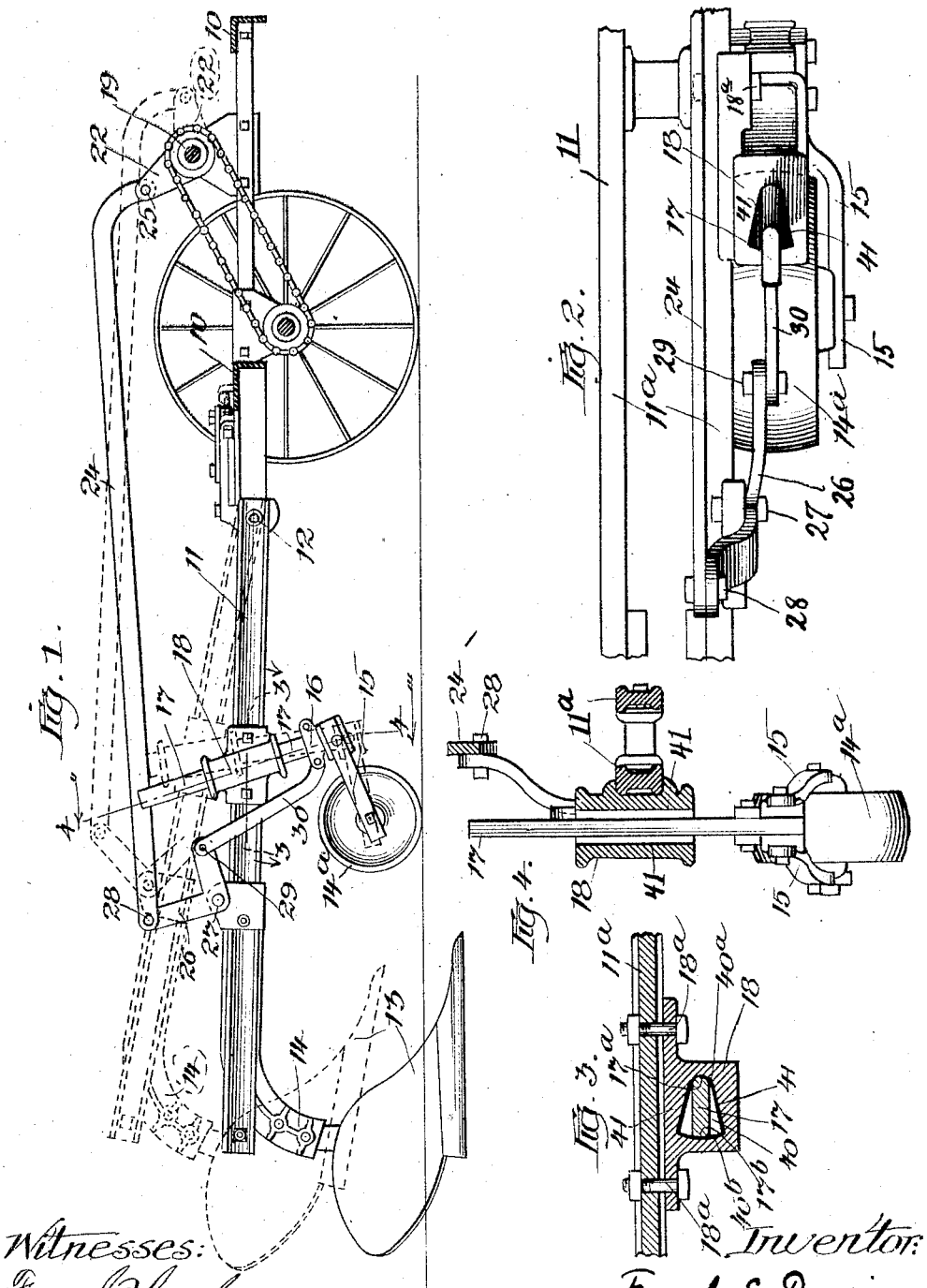
Witnesses:
Frank J. Blanchard
L. C. French
Inventor:
Frank E. Davis
By Fred Gerlach
Attorney.

UNITED STATES PATENT OFFICE.

FRANK E. DAVIS, OF LA CROSSE, WISCONSIN, ASSIGNOR TO LA CROSSE PLOW CO., OF LA CROSSE, WISCONSIN, A CORPORATION OF WISCONSIN.

PLOW.

1,097,396.　　　Specification of Letters Patent.　　Patented May 19, 1914.

Application filed October 18, 1913. Serial No. 795,866.

*To all whom it may concern:*

Be it known that I, FRANK E. DAVIS, a resident of La Crosse, in the county of La Crosse and State of Wisconsin, have invented certain new and useful Improvements in Plows, of which the following is a full, clear, and exact description.

The invention relates to plows and more particularly to gage-wheel mounts whereby the plow beam can be raised and lowered.

The invention designs to provide an improved connection between a slidable gage-wheel standard and the plow beam which permits the wheel to caster a limited extent and which avoids unnecessary friction resulting from the sliding of the standard in its guide, to lessen the power required to operate the beam.

The invention further designs to provide a plow with a gage-wheel which is slidably connected to the beam in such a manner that a substantially fixed relation will be maintained between the plow and the gage-wheel or between the beam pivot and said wheel in raising and lowering the plow so that the wheel will not be operated longitudinally or dragged on the ground in shifting the plow, and thus to lessen the power required to raise the plow.

The invention further designs to provide a castering gage-wheel mount of improved construction.

The invention consists in the several novel features hereinafter set forth and more particularly defined by claims at the conclusion hereof.

In the drawings: Figure 1 is a side elevation of a plow embodying the invention, the frame being shown in section. Fig. 2 is a plan of the connection between the gage-wheel standard and the beam. Fig. 3 is a horizontal section through the gage-wheel standard and its guide. Fig. 4 is a section taken on line 4—4 of Fig. 1.

The invention is shown as applied to a tractor plow comprising a frame 10 which is sustained by carrying wheels in any suitable manner, as well understood in the art. The plow beam 11 is pivoted at its front end, as at 12, so that its rear end may be raised and lowered. The plowshare 13 is secured to a standard 14 which is suitably connected to the beam 11. The beam comprises two bars 11ª between which standard 14 is held. The gage-wheel 14ª is journaled at the rear end of bifurcated arm 15 which has its front end bolted to a bracket 16. Bracket 16 is secured to the lower end of a standard 17 which is slidably mounted in a guide-bracket 18 which is bolted, as at 18ª, to the outer side of one of the beam members 11ª. The power operated lifting mechanism comprises a shaft 19, an arm 22 which is pivoted on said shaft, a link 24 which is pivoted to said arm at 25, an elbow-lever 26 which is pivoted to the plow-beam at 27 and has one of its arms pivoted to the link 24 at 28 and its other arm pivoted at 29 to a supporting link 30 which has its lower end pivotally connected to bracket 16. Operation of link 24 in one direction will shift the elbow lever to raise its fulcrum and the beam under guidance of link 30. Movement of the link rearwardly will cause the plow beam and plow carried thereby to be lowered. The construction of the power operated devices for operating link 24 forms no part of the present invention so that a more complete illustration and description are not deemed necessary.

In practice, it is desirable that gage-wheels, particularly in tractor plows, shall have a limited castering movement to lessen the draft of the plow and for this purpose standard 17 is formed with straight or flat sides and bearing edges 17ª and 17ᵇ, and the guide-socket or channel 40 in bracket 18 is narrow at its front and wide at its rear and has flared sides 41 which will permit the flat standard 17 to have a limited pivotal movement. The front edge 17ª of bar 17 is curved to pivotally seat against the front bearing surface 40ª of socket 40 and the opposite or rear surface 40ᵇ of said socket is curved to permit the standard to caster, and so that as the bar 17 casters it will be held against fore and aft play in the socket. The rear edge 17ᵇ of bar 17 is curved to fit against the surface 40ᵇ so that the bar 17 will be free to slide and will be snugly held against fore and aft movement in the guide 18. This construction of standard and guide is simple and provides for a limited turning of the standard and overcomes in great measure the friction resulting from employment of a round standard and correspondingly shaped guide or bearing, because of the narrow bearing surfaces and the avoidance of contact between the flat sides of the standard and the guide, except when the standard is at the limit of its rotation in one direction. The narrow curved seat 40ª serves also to confine the standard against lateral tilting in the guide, and offers little resistance to the sliding movement between the standard and guide. The construction described also dispenses with the necessity of special stops for limiting the turning of the standard to limit the caster movement, the flared sides of the guide serving as stops. By limiting the castering movement of the gage-wheel, as described and shown, swivel connections for supporting link 30 are unnecessary, a little looseness in its pivotal connections sufficing to permit all the castering movement desired.

In practice, it has been customary to form the guide so that the gage-wheel standard will slide at approximately right angles to the beam. In lieu of doing this, the axis of guide channel 40 and standard 17 is disposed at an angle of less than 90° from the plow-beam, and to such an extent that the point of contact of the gage-wheel will remain in substantially constant relation to the point at which the plow-beam is pivoted to the frame during the raising and lowering of the beam. This construction results in facilitating the operation of raising and lowering, by avoiding the necessity of moving the gage-wheel longitudinally to any substantial extent, so that less power will be required to raise and lower the beam. The invention thus provides a gage-wheel mount which very much lessens binding of the standard in the bracket in which it slides, or friction between them, and in lessening the power required to shift the plow.

The invention is not to be restricted to the details set forth, since these may be modified within the scope of the appended claims without departing from the spirit and scope of the invention.

Having thus described my invention, what I claim as new, and desire to secure by Letters Patent, is:—

1. In a plow, the combination with a plow beam, a plowshare carried by the beam and means for raising the beam, of a gage-wheel, a standard to which the gage-wheel is connected, having a bearing edge, and a guide for slidably connecting the beam and standard, having a pivotal seat for said edge and formed to permit the standard to swing about said seat.

2. In a plow, the combination with a plow beam, a plowshare carried by the beam and means for raising the beam, of a gage-wheel, a standard to which the gage-wheel is connected, having bearing edges at its front and rear, and a guide for slidably connecting the beam and standard having a pivotal seat for one of said edges and a laterally extending bearing surface for the other edge to permit the standard to swing about its bearing on the pivotal seat.

3. In a plow, the combination with a plow beam, of a plowshare carried by the beam and means for raising the beam, of a gage-wheel, a standard to which the gage-wheel is connected, having bearing edges at its front and rear, a guide for slidably connecting the standard and beam having a flared channel therein and a seat in which one of the bearing edges of the standard is pivotally held.

4. In a plow, the combination with a plow beam, of a plowshare carried by the beam and means for raising the beam, of a gage-wheel, a standard to which the gage-wheel is connected, having bearing edges at its front and rear, and a guide for slidably connecting the standard and beam, having a seat for pivotally holding one of the bearing edges of the standard, a bearing for the other edge of the standard and flared sides which permit the other bearing edge to move laterally in the guide.

5. In a plow, the combination with a plow beam, of a plowshare carried by the beam and means for raising the beam, of a gage-wheel, a standard to which the gage-wheel is connected, having substantially flat sides and bearing edges at its front and rear and a guide having a seat for pivotally holding one of the bearing edges of the standard, flared sides which limit the pivotal movement of the standard, and a bearing surface for the opposite bearing edge of the standard formed to permit the latter edge to move laterally.

6. In a plow, the combination of a frame, a beam pivoted to the frame, a plow carried by the beam, a gage-wheel and a slidable connection between the wheel and the beam, comprising a guide having the axis of its sliding movement angled acutely and forwardly below the beam.

7. In a plow, the combination of a frame, a beam pivoted to the frame, a plow carried by the beam, a gage-wheel and a slidable connection between the beam and the gage-wheel comprising a standard and a guide, the axis of the standard being angled acutely and forwardly below the beam.

8. In a plow, the combination of a frame, a beam pivoted to the frame, a plow carried by the beam, a gage-wheel and a slidable connection between the beam and the gage-wheel comprising a standard and a guide, the axis of the standard being angled acutely forwardly below the beam, the standard being pivotally movable in the guide.

FRANK E. DAVIS.

Witnesses:
H. W. ROBINSON,
A. J. BRUHA.